(12) United States Patent
Schäfer (10) Patent No.: US 11,975,332 B2
(45) Date of Patent: May 7, 2024

(54) IMPACT REACTOR

(71) Applicant: SCHÄFER ELEKTROTECHNIK U. SONDERMASCHINEN GMBH, Rüssingen (DE)

(72) Inventor: Ralf Schäfer, Rüssingen (DE)

(73) Assignee: SCHÄFER ELEKTROTECHNIK U. SONDERMASCHINEN GMBH, Rüssingen (DE)

(*) Notice: Subject to any disclaimer, the term of this patent is extended or adjusted under 35 U.S.C. 154(b) by 104 days.

(21) Appl. No.: 17/592,369

(22) Filed: Feb. 3, 2022

(65) Prior Publication Data
US 2022/0152618 A1    May 19, 2022

Related U.S. Application Data

(62) Division of application No. 16/327,397, filed as application No. PCT/EP2017/071253 on Aug. 23, 2017, now abandoned.

(30) Foreign Application Priority Data

Aug. 24, 2016    (DE) .......................... 102016115714.7

(51) Int. Cl.
*B02C 18/14*     (2006.01)
*B02C 13/13*     (2006.01)
(Continued)

(52) U.S. Cl.
CPC .............. *B02C 13/14* (2013.01); *B02C 13/13* (2013.01); *B02C 19/0056* (2013.01);
(Continued)

(58) Field of Classification Search
CPC ......... B02C 13/02; B02C 13/13; B02C 13/14; B02C 13/18
See application file for complete search history.

(56) References Cited

U.S. PATENT DOCUMENTS

| 1,875,817 | A | | 9/1932 | London |
| 3,456,886 | A | * | 7/1969 | Gustavo ................ B02C 17/007 241/5 |

(Continued)

FOREIGN PATENT DOCUMENTS

| CN | 106391267 | A | * | 2/2017 | ............. B02C 23/02 |
| CN | 108187887 | A | * | 6/2018 | ............. B02C 13/14 |

(Continued)

OTHER PUBLICATIONS

International Search Report prepared by the European Patent Office dated Nov. 17, 2017, for International Application No. PCT/EP2017/071253.

(Continued)

*Primary Examiner* — Faye Francis
(74) *Attorney, Agent, or Firm* — Sheridan Ross P.C.

(57) ABSTRACT

An impact reactor for comminuting composite materials having a rotor with impact elements is arranged in a cylindrical casing. An end face of the impact reactor, remote from the rotor, is closed by a cover. A suction opening is assigned to the cover and a classifying device is assigned to the suction opening. Such an impact reactor may be used to process, by way of example, accumulator batteries, mineral wool and raw material.

18 Claims, 8 Drawing Sheets

(51) Int. Cl.
*B02C 13/14* (2006.01)
*B02C 19/00* (2006.01)
*B02C 23/14* (2006.01)
*B02C 23/16* (2006.01)
*B02C 23/20* (2006.01)

(52) U.S. Cl.
CPC .............. *B02C 23/14* (2013.01); *B02C 23/16* (2013.01); *B02C 23/20* (2013.01); *B02C 2023/165* (2013.01); *B02C 2201/06* (2013.01)

(56) References Cited

U.S. PATENT DOCUMENTS

| | | | |
|---|---|---|---|
| 3,544,015 A | | 12/1970 | Gulic et al. |
| 3,669,265 A | | 6/1972 | Conley |
| 3,698,650 A | | 10/1972 | Knight |
| 3,899,139 A | | 8/1975 | Okada et al. |
| 4,013,751 A | | 3/1977 | Davis et al. |
| 4,037,796 A | | 7/1977 | Francis |
| 4,087,052 A | | 5/1978 | Rohrbach |
| 4,245,999 A | | 1/1981 | Reiniger |
| 4,296,864 A | | 10/1981 | Misaka et al. |
| 4,428,536 A | | 1/1984 | Rodgers |
| 4,661,244 A | | 4/1987 | Hanke et al. |
| 4,689,141 A | | 8/1987 | Folsberg |
| 4,799,595 A | | 1/1989 | Binder |
| 4,993,647 A | | 2/1991 | Williams |
| 5,236,133 A | | 8/1993 | Lundquist |
| 5,632,863 A | * | 5/1997 | Meador ................... C10B 53/00 201/3 |
| 6,524,737 B1 | * | 2/2003 | Tanii ..................... H01M 10/54 429/49 |
| 6,543,709 B2 | | 4/2003 | Huang et al. |
| 7,207,504 B2 | | 4/2007 | Willmot |
| 7,665,677 B2 | | 2/2010 | Montag |
| 7,967,226 B2 | | 6/2011 | Gocke |
| 8,882,007 B1 | * | 11/2014 | Smith ..................... H01M 10/54 241/23 |
| 2004/0056128 A1 | | 3/2004 | Uebayashi et al. |
| 2005/0241943 A1 | * | 11/2005 | Kakuta ................. H01M 10/52 205/59 |
| 2012/0174369 A1 | | 7/2012 | Ming et al. |
| 2012/0305684 A1 | * | 12/2012 | Bhandari ................ B03B 9/061 241/23 |
| 2013/0008986 A1 | | 1/2013 | Zickell et al. |
| 2013/0199424 A1 | | 8/2013 | Abraham et al. |
| 2014/0008470 A1 | | 1/2014 | Schaefer |
| 2014/0183290 A1 | | 7/2014 | Xiao |
| 2015/0274978 A1 | | 10/2015 | Hilbert et al. |
| 2016/0043450 A1 | * | 2/2016 | Sloop .................... H01M 10/54 252/182.1 |
| 2018/0301769 A1 | * | 10/2018 | Hanisch .................. C22B 1/005 |
| 2019/0176160 A1 | | 6/2019 | Schafer |
| 2019/0262840 A1 | | 8/2019 | Schafer |

FOREIGN PATENT DOCUMENTS

| | | | | |
|---|---|---|---|---|
| CN | 109046723 A | * | 12/2018 | ............ B02C 13/16 |
| CN | 110560217 A | * | 12/2019 | ............ B02C 13/14 |
| CN | 112058451 A | * | 12/2020 | ............ B02C 13/18 |
| DE | 2252758 | | 5/1973 | |
| DE | 1265702 | | 11/1973 | |
| DE | 2344582 | | 4/1974 | |
| DE | 4237637 | | 5/1994 | |
| DE | 29707269 | | 8/1997 | |
| DE | 9321650 U1 | * | 8/2002 | ............ B02C 13/14 |
| DE | 102005055620 | | 5/2007 | |
| DE | 10-2009-027179 | | 12/2010 | |
| DE | 10-2010-006916 | | 8/2011 | |
| DE | 20-2012-007423 | | 9/2012 | |
| DE | 10-2011-080375 | | 2/2013 | |
| DE | 10-2013-011470 | | 1/2015 | |
| DE | 102016115714 | | 3/2018 | |
| DE | 102017102281 A1 | * | 8/2018 | ............ B02C 13/14 |
| DE | 102017103956 | | 8/2018 | |
| EP | 0859693 | | 4/2000 | |
| EP | 2923766 | | 9/2015 | |
| WO | WO 97/18071 | | 5/1997 | |
| WO | WO 2009/028795 | | 3/2009 | |
| WO | WO 2012/107526 | | 8/2012 | |
| WO | WO-2017041185 A1 | * | 3/2017 | ............ B02C 13/16 |

OTHER PUBLICATIONS

International Preliminary Report on Patentability for International (PCT) Patent Application No. PCT/EP2017/071253, dated Mar. 7, 2019, 9 pages.

German Search Report (No English translation available) for German Patent Application No. 10-2016-115714.7, dated Jun. 1, 2017, 7 pages.

Official Action for U.S. Appl. No. 16/327,397, dated Feb. 8, 2021 7 pages Restriction Requirement.

Official Action for U.S. Appl. No. 16/327,397, dated Apr. 28, 2021 13 pages.

Official Action for U.S. Appl. No. 16/327,397, dated Nov. 3, 2021 11 pages.

* cited by examiner

IMPACT REACTOR

CROSS-REFERENCE TO RELATED APPLICATIONS

This application is a divisional application of and claims priority to U.S. patent application Ser. No. 16/327,397 filed 22 Feb. 2019, which is a national stage application under 35 U.S.C. § 371 and claims the benefit of PCT Application No. PCT/EP2017/071253 having an international filing date of 23 Aug. 2017, which designated the U.S., which PCT application claimed the benefit of German Patent Application No. 10 2016 115 714.7 filed 24 Aug. 2016, the entire disclosure of each of which are incorporated herein by reference.

The invention relates to an impact reactor for comminuting composite materials, comprising a cylindrical casing, in which a rotor provided with impact elements is mounted, wherein the impact reactor is closed by means of a cover on the end face facing away from the rotor, wherein a suction opening is assigned to the cover.

Impact reactors are used in order to comminute objects, which are composed of different materials, in such a way as to allow the separation of substances. As a result, the objects are comminuted and separated into individual components by impact stress with high momentum transfer by means of rotating impact elements.

EP 0 859 693 B1 discloses an impact reactor comprising a cylindrical main body, in which a rotor driven by a drive motor is arranged. The rotor is formed from wear-resistant steel and has replaceable impact elements on its propeller-shaped or blade-shaped ends.

In the circumferential area of the impact reactor ejection openings can be arranged which can be covered with slotted or perforated cover plates so as to be able to achieve a differentiated discharge of comminuted particles in a desired particle size.

Currently, there is a problem to comminute objects which have components in powder form. In this connection, for example lithium-ion batteries are problematic. In the initial state, lithium-ion batteries have an active mass which is charged with solvent and is applied to a synthetic material film coated with copper and aluminum. During the processing of the accumulator batteries, a pulverulent dust is formed from the active mass. This applies particularly when the accumulator batteries are pyrolyzed prior to comminution in an impact reactor. The pulverulent dust cannot be selectively led out of the impact reactor using the known extraction openings arranged in the circumferential area of the impact reactor.

The object of the invention is to provide an impact reactor for comminuting composite materials, which allows for pulverulent components to be led out of said impact reactor.

This object is achieved by the features of claim 1. The dependent claims refer to advantageous embodiments.

The inventive impact reactor for comminuting composite materials comprises a cylindrical casing, in which a rotor provided with impact elements is mounted, wherein the impact reactor is closed by means of a cover on the end face facing away from the rotor, wherein a suction opening is assigned to the cover, wherein a classifying device is assigned to the extraction opening.

According to the invention, the classifying device is part of the impact reactor and is assigned directly to the suction opening. Preferably, the rotor of the impact reactor is arranged in the bottom area of the casing. The cover having the suction opening is arranged on the end face facing away from the rotor so that the suction opening is arranged at the largest possible distance from the rotor. Alternatively, it is possible to arrange the suction opening in the casing. If composite materials which have components in powder form are fed to the impact reactor, a dust-containing atmosphere is produced within the impact reactor during the mechanical loading by the rotor. Coarse particles can be separated off by means of the classifying device arranged in the suction opening in such a way that only pulverulent dust can be removed from the suction opening.

Following on from the classifying device, the powder or dust-loaded exhaust air can then be treated. For this purpose, a physical separation method is preferably used. The treatment can be performed for example in a gravity separator or centrifugal separator. In this case, it is particularly possible to use a zigzag separator.

The classifying device can be a screen. Screens are classifying devices which are designed in a particularly simple manner and are particularly robust. By selecting the hole diameter or respectively mesh width, it is possible to define the particle sizes to be allowed through.

In an advantageous embodiment, the screen is roller-shaped. A roller-shaped screen has a large screen surface, which is associated with a low pressure loss and a high screen performance. The screen can be arranged both horizontally and vertically in the impact reactor.

The screen can be arranged to be able to rotate in the suction opening. In the case of a rotating screen, a centrifugal force field is formed directly around the screen. This ensures that larger particles cannot pass through the screen, even if they could pass through the holes or meshes. In this respect, a rotating screen allows particularly fine particles to be separated.

In an alternative embodiment, the classifying device is designed as an air separator. In the case of an air separator, particles are separated in a gas stream on the basis of their ratio of inertia or respectively gravity to flow resistance. Fine or lightweight particles follow the flow, whereas heavier particles follow the mass force.

The classifying device can be formed as a deflection wheel. In an advantageous embodiment, the deflection wheel has two spaced apart rotor disks having rotor blades arranged between them. The deflection wheel is a specific type of an air separator. The deflection wheel is formed in the form of a ventilator. The air including the comminuted particles flows through the rotating rotor. A momentum transfer takes place between the rotor and incoming particles. At the same time, the particles are swept into the incoming airflow. Particles, in which the shear force exerted by the airflow is less than the centrifugal force induced by the rotation of the rotor, undergo a change in direction by reason of the momentum transfer of the rotor and are directed back into the impact reactor chamber. In this respect, the diverted particles are not allowed to pass through the deflection wheel. In contrast, particles, in which the shear force of the airflow is greater than the centrifugal force exerted by the rotor, pass with the airflow through the deflection wheel.

In the case of deflection wheels, it is advantageous that they have a large separation effect, in particular for small and lightweight particles. As a result, the particle size of the particles to be allowed to pass through can be set precisely. Furthermore, a deflection wheel is particularly robust. Thus, it can even be used for comminuting abrasive particles.

Preferably, the deflection wheel is designed in such a way to prevent particles from accumulating in the interior of the deflection wheel or on the rotor blades.

For that purpose, the rotor blades can be designed in such a way that they are rounded on the outer side. In addition, the rotor blades can have a tube, the inner side of which has metal plate strips arranged thereon which contact one another at an edge. As a result, the rotor blade is rounded on the outer side and the rotor blade has a triangular basic shape on the inner side.

According to a further advantageous embodiment, a baffle plate which can be pyramid-shaped is arranged on the bottom plate of the rotor. As a result, the flow cross-section in the interior of rotor is reduced in the direction of the suction opening. By reason of the reduction of the cross-section, the flow rate increases considerably in this region. Particles passing through the deflection wheel are thereby reliably led out of the deflection wheel.

The classifying device can be designed to separate particles having a pre-selectable particle size. It is particularly advantageous that the particle size can be set depending upon the material to be comminuted and depending upon the desired comminution result. The classifying device can be adjusted in such a way that particles having a predetermined particle size are separated via the suction opening during a comminuting cycle.

Furthermore, it is possible that, during a comminuting cycle, the classifying device separates particles having a first particle size in a first section and separates particles having a second particle size in a second section. In this case, the classifying device is modified during a comminuting cycle in such a way that the classifying device separates particles having a different particle size.

Such a modification is particularly suitable/simple in the case of a rotating screen or a deflection wheel. For both embodiments, a modification is effected by changing the rotational speed. If the rotational speed increases, the particle size of the particles allowed to pass through the rotating screen or through the deflection wheel is decreased. The modification can also be effected during a comminuting cycle and in an infinitely variable manner.

A cleaning apparatus can be allocated to the classifying device. For that purpose, the classifying device can be provided with a device for applying a counter pressure, for example on the side of the suction opening. In addition, for example jet nozzles or lances can be provided. These can also protrude into the interior of the classifying device and can trigger a pressure surge for example when a preselected differential pressure is exceeded, said pressure surge effecting cleaning of the classifying device. This prevents the classifying device from becoming clogged. The cleaning medium can be a gas, for example a cooling gas or a hot gas. The cleaning medium can also be a liquid.

A supply air opening can be introduced into the impact reactor. This allows a circulating airflow to be produced. As a result, the discharge of particles from the impact reactor is improved. Furthermore, it is possible to impinge an inert gas, such as for example nitrogen, on the impact reactor. This is particularly advantageous when reactive or explosive materials are to be processed in the impact reactor.

The supply air opening also allows the temperature of the supply air to be controlled in a particularly simple manner so that for example drying can be performed in the impact reactor. This process is improved once again by a previously performed procedure of drying the supply air. Furthermore, the classifying device can also be provided with a drying device so that the exhaust air provided with particles can be dried. By controlling the temperature of the supply air, it is likewise possible to effect cooling so that the atmosphere within the impact reactor chamber can be cooled by the supply air.

The casing can be closed in the region of the rotor. This ensures that the impact reactor has a particularly long service life which is associated with a low maintenance outlay. However, it can be provided that extraction openings in the form of flaps are provided in the circumferential area of the casing in the region of the rotors. The extraction openings allow for coarse particles, in particular metallic particles, to be removed from the impact reactor.

Screens can be assigned to the extraction openings. As a result, substance separation can be performed. For example, metallic particles which have achieved a desired degree of comminution can be removed via the screens, whereas larger particles remain in the impact reactor chamber and are further comminuted.

A device for exhaust air after-treatment of the exhaust air removed via the suction opening can be assigned to the classifying device. Such exhaust air after-treatment is particularly advantageous when noxious gases, for example reactive gases, are produced by the comminution. Such noxious gases are removed from the exhaust air during the exhaust air after-treatment. A simple and cost-effective exhaust air after-treatment is provided for example by post-combustion of the exhaust air in a combustion chamber. Furthermore, it is possible to perform gas filtration or the like.

The inventive method of processing accumulator batteries in an impact reactor allows for that accumulator batteries are fed to the impact reactor and are comminuted in the impact reactor by means of mechanical loading of the rotor provided with impact elements, wherein the dusty parts of the accumulator batteries are removed from the impact reactor via the suction opening.

The accumulator batteries can be opened in a first step prior to being fed to the impact reactor.

After being opened, the accumulator batteries can initially be fed to a treatment by pyrolysis, in which volatile or combustible components are removed from the accumulator batteries and wherein the accumulator batteries are subsequently fed to the impact reactor.

The inventive method makes it possible to process accumulator batteries for further use, wherein the dusty, particulate components, the so-called black mass or active mass, can be safely discharged from the impact reactor and processed. This is particularly advantageous given the fact that valuable base materials are contained in the black mass or active mass.

The method can be conducted in such a way that non-pyrolyzed accumulator batteries are comminuted in the impact reactor. In this case, inertization of the impact reactor chamber prevents explosive components of the accumulator batteries from igniting. In the case of pyrolyzed accumulator batteries, the impact reactor chamber does not have to undergo inertization.

The exhaust air drawn off via the suction opening can be re-treated. The exhaust air after-treatment can be effected in particular by exhaust air post-combustion, in which reactive gases of the exhaust air are converted. The exhaust air after-treatment can take place right after the classifying procedure. In this connection, a stepwise operation of the classifying device is advantageous, wherein the classifying device is initially adjusted in such a way that solely gaseous components are drawn off from the impact reactor chamber and are fed to the exhaust gas after-treatment procedure and subsequently, the classifying device is adjusted in such a way that dust-like solid particles are discharged from the impact reactor chamber. In this case, it is advantageous that initially reactive gases or noxious gases are discharged from the impact reactor chamber. After the dust-like particles have been discharged, only heavier or larger solid particles, predominantly metals, remain in the impact reactor chamber which are discharged via the extraction opening.

The inventive method is particularly suitable for processing lithium-ion batteries. However, alkaline manganese cells, zinc carbon cells or the like can also be fed to the impact reactor.

The inventive impact reactor can also be used in an advantageous manner for processing mineral wool. Mineral wool as a waste material is produced for example during manufacture and in construction, for example during renovations or modernizations. The need exists to introduce mineral wool, in this case particularly rock wool, glass wool or ceramic wool, to recycling. However, a current problem is that the mineral wool can only be transported with limitations by reason of its fiber structure and low density. For example, it is problematic that mineral wool to be processed cannot be transported in a problem-free manner when using the blowing method.

In the inventive method, the mineral wool to be processed is fed to the impact reactor and is comminuted in the impact reactor by mechanical loading of the rotor provided with impact elements, wherein the comminuted mineral wool is removed from the impact reactor via the suction opening if the particle size of the mineral wool is smaller than a predetermined particle size.

As a result, it is possible to comminute, or respectively to shorten the fibers of the mineral wool in such a way that the mineral wool does not agglomerate and can therefore be fed more effectively to a further processing procedure. Also, the mineral wool shows better product properties. Comminuted mineral wool comprising short fibers can be transported for example by using the blowing method.

The inventive impact reactor is also suitable for processing raw material. In the corresponding inventive method, the raw material is fed to the impact reactor and is comminuted in the impact reactor by mechanical loading of the rotor provided with impact elements, wherein the comminuted raw material is removed from the impact reactor via the suction opening if the raw material particles are smaller than a predetermined particle size.

In this connection, it is for example possible to comminute mineral material such as clay in the impact reactor, wherein dust-like clay particles are removed via the suction opening. The configuration of the impact reactor allows the particle size of the clay particles to be preselected so that clay particles in desired particle sizes can be fed to a further processing procedure.

The inventive impact reactor can also be used for processing wood, matured timber, wood composites, ceramics, GFRP, CFRP, wood compound and composite materials consisting of the aforementioned materials, even if they are in the composite with metal. Metal-metal composites, as used for example in catalysts, can also be comminuted. Equally, secondary raw materials such as dross, sewage sludge, screenings or ash can be processed in the impact reactor, wherein separation of a dust-like fraction is effected via the suction opening. It is particularly possible by using the impact reactor to produce a particulate fuel surrogate from the aforementioned substances, said fuel surrogate being able to be directed to a dust firing or granulate firing procedure.

Furthermore, it is possible to comminute organic material, such as grain or rice, in the inventive impact reactor. On the one hand, the impact reactor is suitable for producing a meal-like product which can be removed via the suction opening. On the other hand, the impact reactor is also suitable for comminuting organic associated materials, such as wheat bran or husks which can then be fed more easily and more effectively to a material or energy recycling procedure.

Some embodiments of the inventive impact reactor will be explained in more detail hereinafter with the aid of the figures. The figures show, in each case schematically.

The figures show an impact reactor 1 or an impact reactor arrangement for comminuting composite materials. The impact reactor 1 comprises a cylindrical casing 2 consisting of metallic material. A rotor 4 which is provided with impact elements 5 is arranged in the interior of the casing 2 in the bottom area 3. The rotor 4 is operatively connected to an electric motor 6 which is arranged outside the casing 2. The shaft connecting the rotor 4 to the electric motor 6 extends in the axial direction of the cylindrical casing 2. The rotor 4 is provided with blades which protrude radially from the shaft. Impact elements are arranged at the free ends of the blades. The impact elements are interchangeably fastened to the blades.

The impact reactor 1 is closed, at the end face facing away from the rotor 4, by means of a cover 7. The cover 7 is assigned to a suction opening 8, in which a classifying device 9 is arranged.

A supply air opening is placed into the impact reactor. Said opening allows an overpressure to be built up within the impact reactor 1. Furthermore, an inert gas can be fed to the interior of the impact reactor 1.

The inventive impact reactor 1 is suitable in particular for processing accumulator batteries, in particular for processing lithium-ion batteries.

For processing purposes, these accumulator batteries are opened in a first step. This can be performed for example by a spiked roller or the like. In a second step, the accumulator batteries are fed to a treatment by pyrolysis, in which volatile or combustible components are removed from the accumulator batteries. In a next step, the accumulator batteries are comminuted in the impact reactor 1 by mechanical loading of the rotor 4 provided with the impact elements. Dusty parts of the accumulator batteries are removed from the impact reactor 1 via the suction opening 8. Larger particles, for example metallic granulate material, accumulates in the bottom area of the impact reactor and is removed cyclically from the impact reactor.

Figure 1:
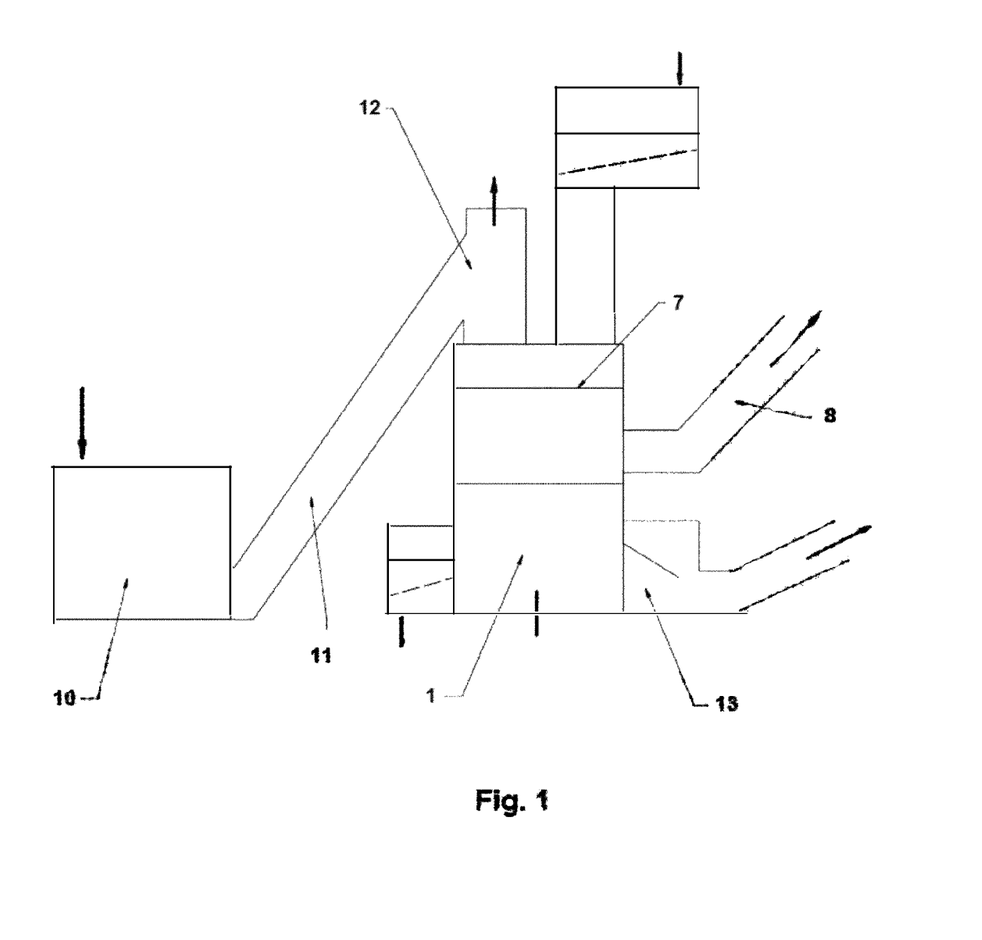
FIG. 1 an impact reactor arrangement.

FIG. 1 shows an impact reactor arrangement which is suitable in particular for processing accumulator batteries, for example lithium-ion batteries. The material to be comminuted, for example batteries, is removed from a bunker container 10 comprising a weighing device and is introduced into the impact reactor 1 via a feed belt 11 having a materials lock 12. At this location, the material is comminuted by mechanical energy introduced via the rotors 4.

During comminution, the components of the accumulator batteries are separated from one another, wherein larger components consisting of metal or synthetic material accumulate in the bottom area of the impact reactor and can be removed via a removal device 13 arranged in the bottom area. Sorting can be performed by means of a magnetic discharge which separates magnetic materials from non-magnetic materials.

In contrast, particulate components, in particular black mass contained in the accumulator batteries, are led out of the impact reactor via the suction opening 8 arranged in the region of the cover 7.

The inner space of the impact reactor can be inertized. Furthermore, the inner space of the impact reactor can have a lower pressure in comparison with the surrounding area and therefore undesired gaseous components cannot escape from the comminution process into the surrounding area.

Figure 2:
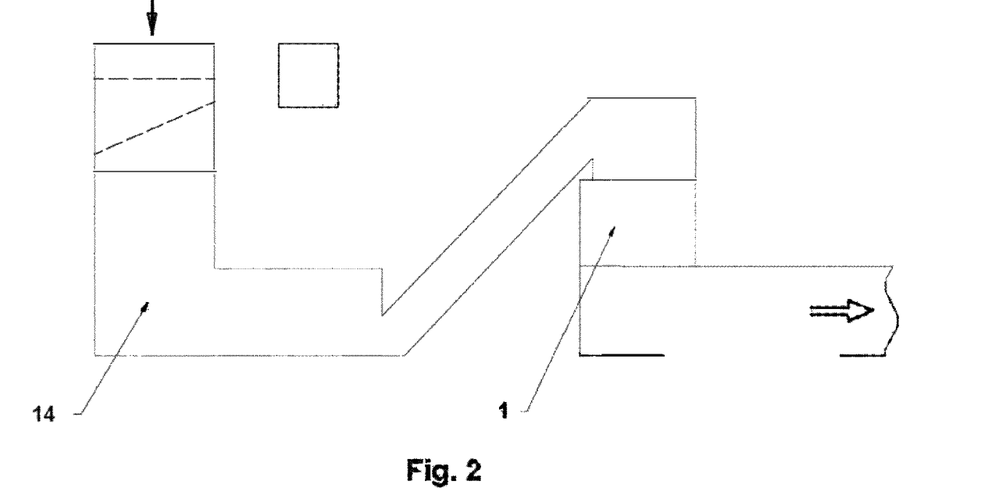
FIG. 2 a device for pyrolyzing accumulator batteries.

Preferably, pyrolyzed accumulator batteries are fed to the above-described arrangement regarding the impact reactor 1. A device for pyrolyzing accumulator batteries and the like is shown in FIG. 2.

Material, in particular accumulator batteries, is removed from a container 14 and fed to an impact reactor 1 via a material feed. At this location, the material, for example accumulator batteries, is mechanically loaded in such a way that housing parts are opening and any windings of electrode layers are opening. The energy supplied is relatively low and thus the material is not comminuted but instead is merely broken up so that all of the components of the material react in the same manner under the treatment by pyrolysis. Following this pre-treatment, the material is fed to a treatment by pyrolysis. The material being broken up beforehand prevents explosive gases from suddenly escaping. The treatment by pyrolysis can be initiated uniformly and can be performed in a continuous manner.

Figure 3:
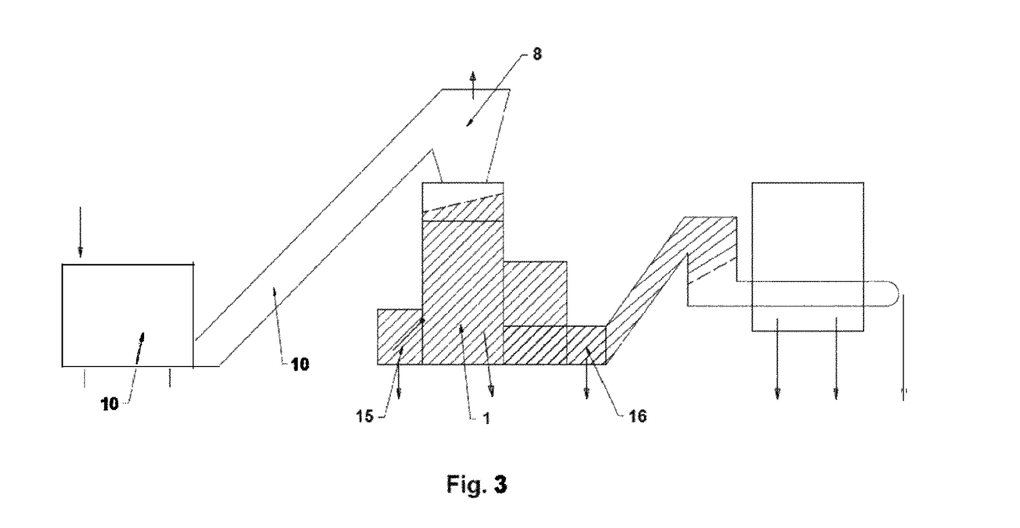
FIG. 3 a further impact reactor arrangement.

FIG. 3 shows a further embodiment of an impact reactor arrangement. The embodiment shown in FIG. 3 is particularly suitable for comminuting objects comprising non-pyrolyzed accumulator batteries. This is particularly advantageous for objects which are provided with fixedly installed or integrated accumulator batteries.

In the case of this embodiment, the material is fed to the impact reactor 1 via an inertization lock which prevents gases from escaping from the impact reactor 1 into the surrounding area. Provided in the bottom area, is an inertized material discharge 15 through which extraneous material can be removed. Furthermore, a magnetic discharge 16 is arranged in the bottom area.

Figure 4:
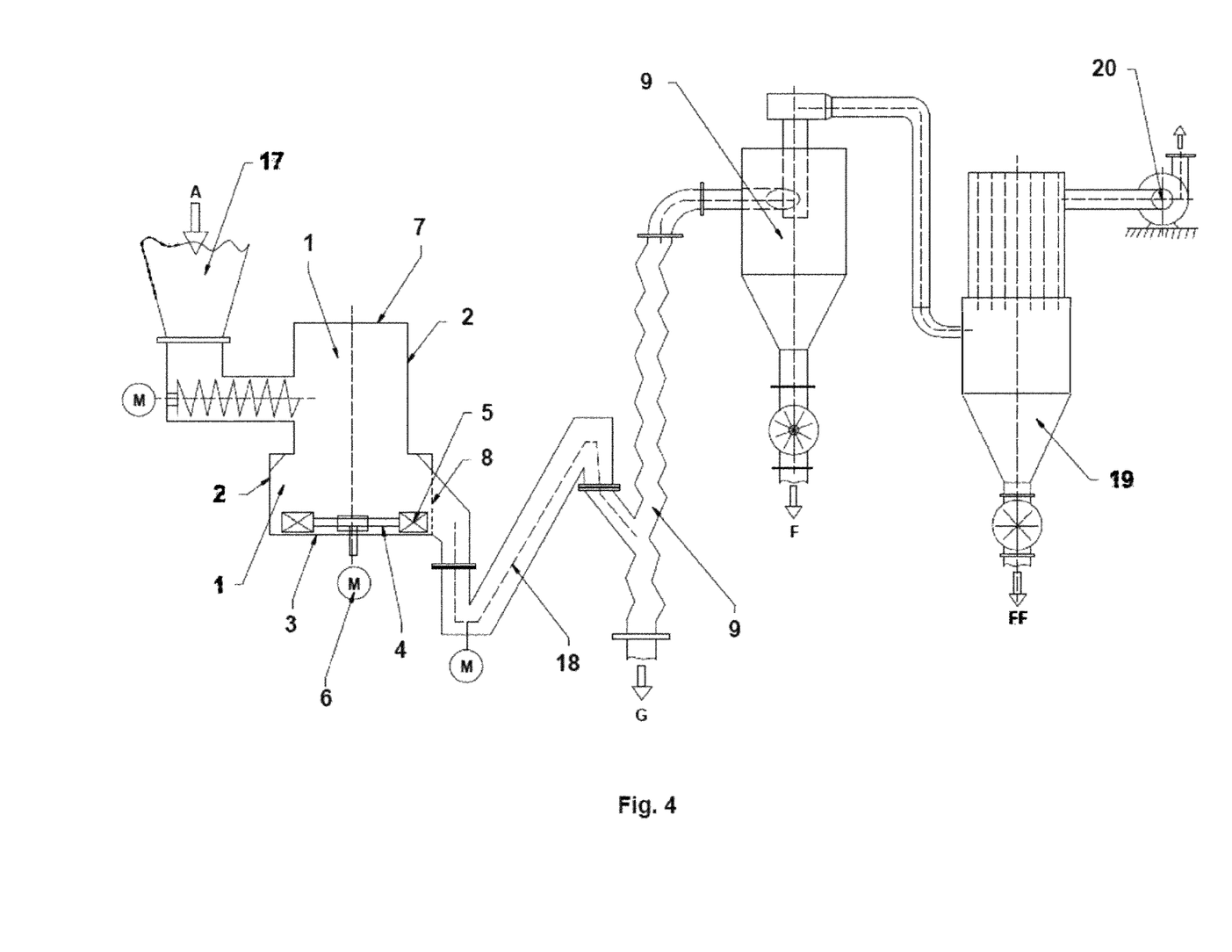
FIG. 4 an impact reactor arrangement having a feeding device and classifying device.

FIG. 4 shows an installation diagram of an impact reactor arrangement. Material is fed to the impact reactor 1 via a metering facility 17. The material is discharged via a suction opening 8. In the adjoining rising main 18, course particles are separated and the remaining material is fed to a classifying device 9 in the form of a zigzag separator for classification. A cyclone separator is connected to the classifying device 9 in order to deposit fine material. Subsequently, the gas flow passes through a fines separator 19 for depositing very fine material and passes into the surrounding area via a fan 20.

Figure 5:
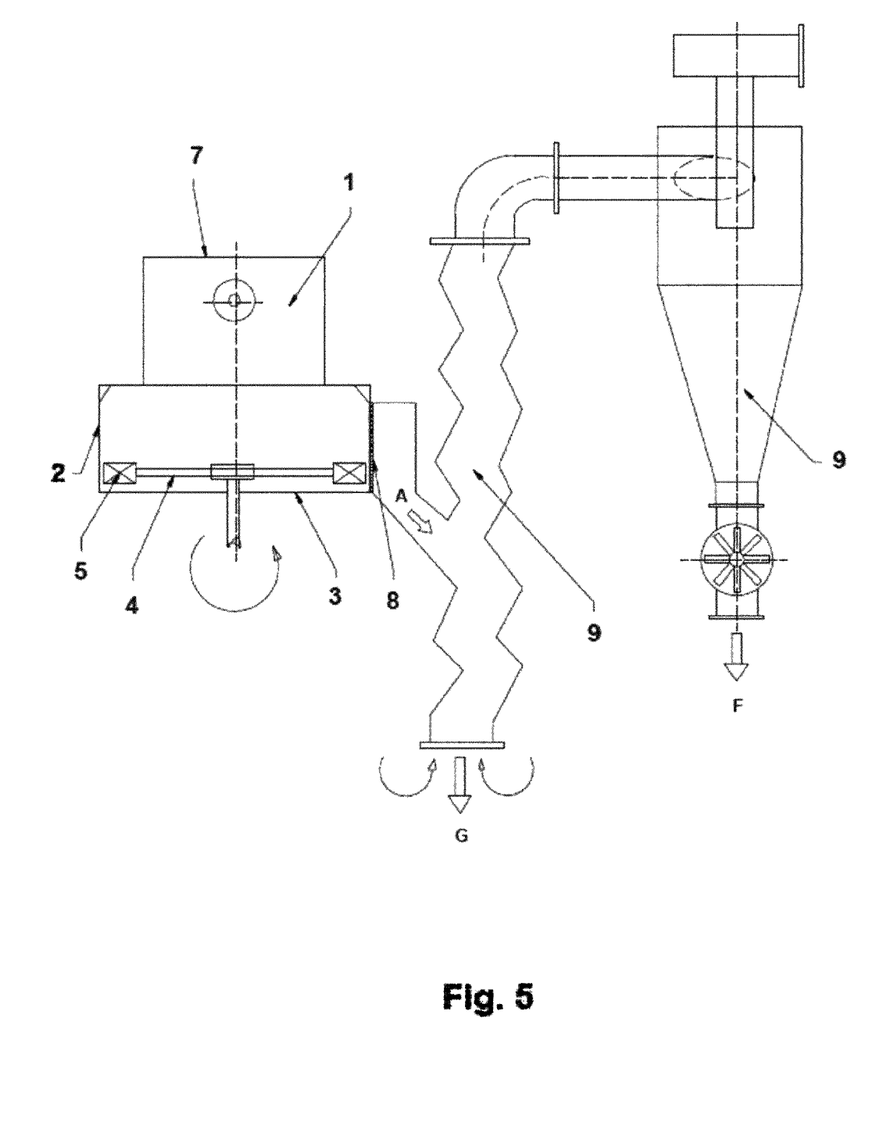
FIG. 5 an impact reactor arrangement having a zigzag separator and cyclone separator.

FIG. 5 shows in detail the arrangement consisting of the impact reactor 1 and the classifying device 9 comprising a zigzag separator and a cyclone separator.

Figure 6:
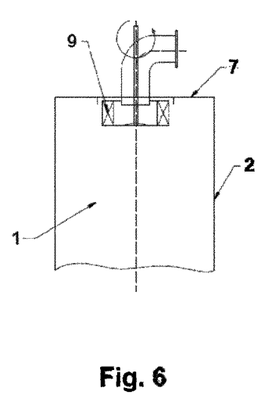
FIGS. 6, 6b and 6c illustrate different embodiments of deflection wheels in detail.
Figure 6B:
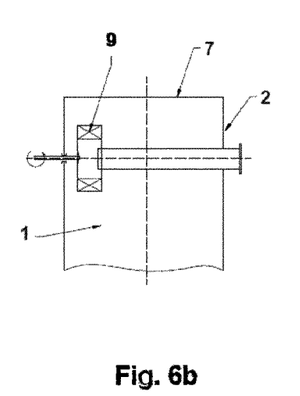
Figure 6C:
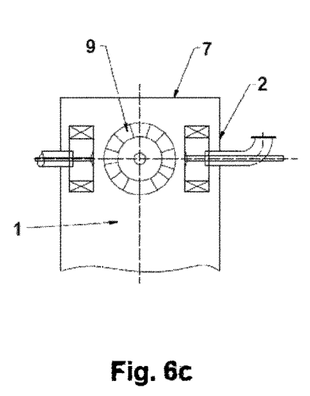

In the embodiment shown in FIG. 6, the classifying device 9 is formed as a deflection wheel. The deflection wheel has two mutually spaced apart rotor disks having rotor blades arranged between them. The rotor blades are rounded on the outer side and taper on the inner side. Therefore, the rotor blades have a tear-shaped configuration in cross-section. FIG. 6a shows a deflection wheel which rotates axially with respect to the casing 2 and FIG. 6b shows a deflection wheel which rotates radially with respect to the casing 2. FIG. 6c shows a plurality of deflection wheels arranged in the impact reactor 1.

Figure 7A:
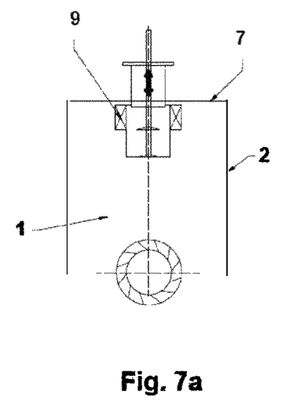
FIGS. 7a, 7b and 7c illustrate different separators integrated into the impact reactor in detail.
Figure 7B:
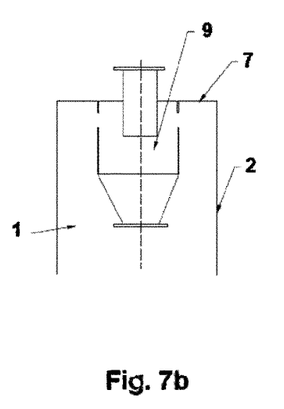
Figure 7C:
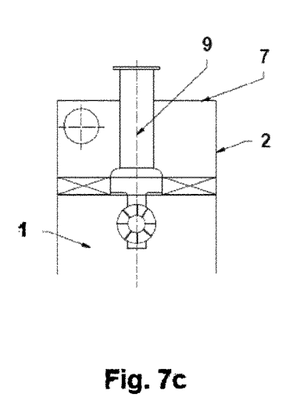

FIGS. 7a, 7b and 7c show different embodiments of statically functioning classifying devices 9.

Figure 8A:
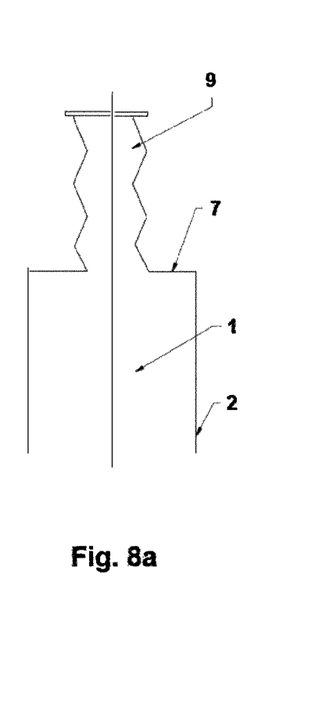
FIGS. 8a, 8b and 8c illustrate different sizers arranged in the head region of the impact reactor in detail.
Figure 8B:
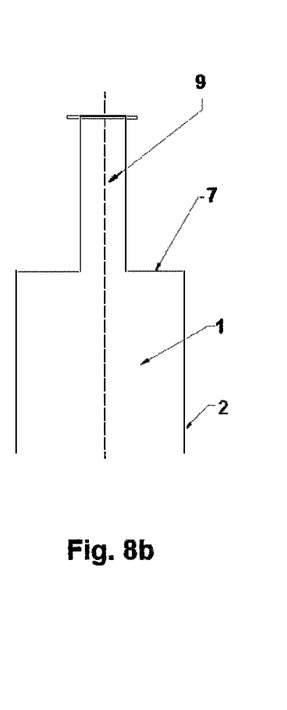
Figure 8C:
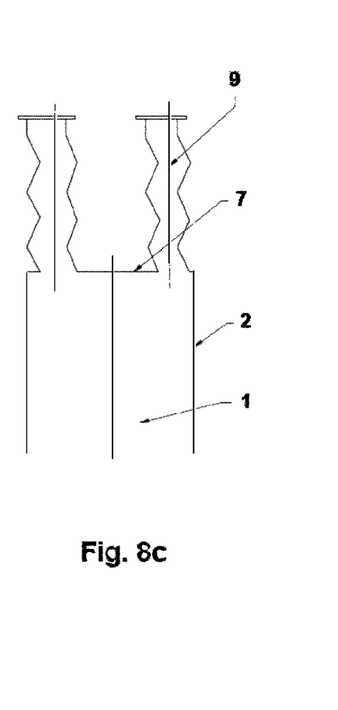

FIGS. 8a, 8b and 8c show different embodiments of classifying devices 9 in the form of gravity separators.

Figures 9A, 9B:
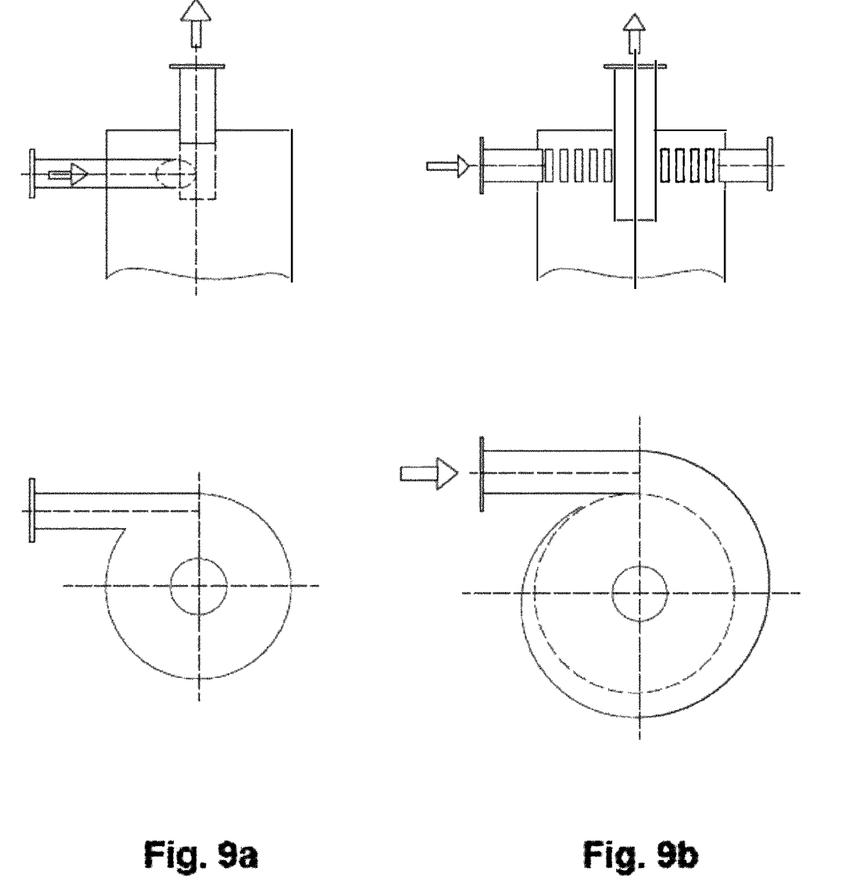
FIGS. 9a and 9b illustrate different embodiments of cyclone separators.
Figure 10:
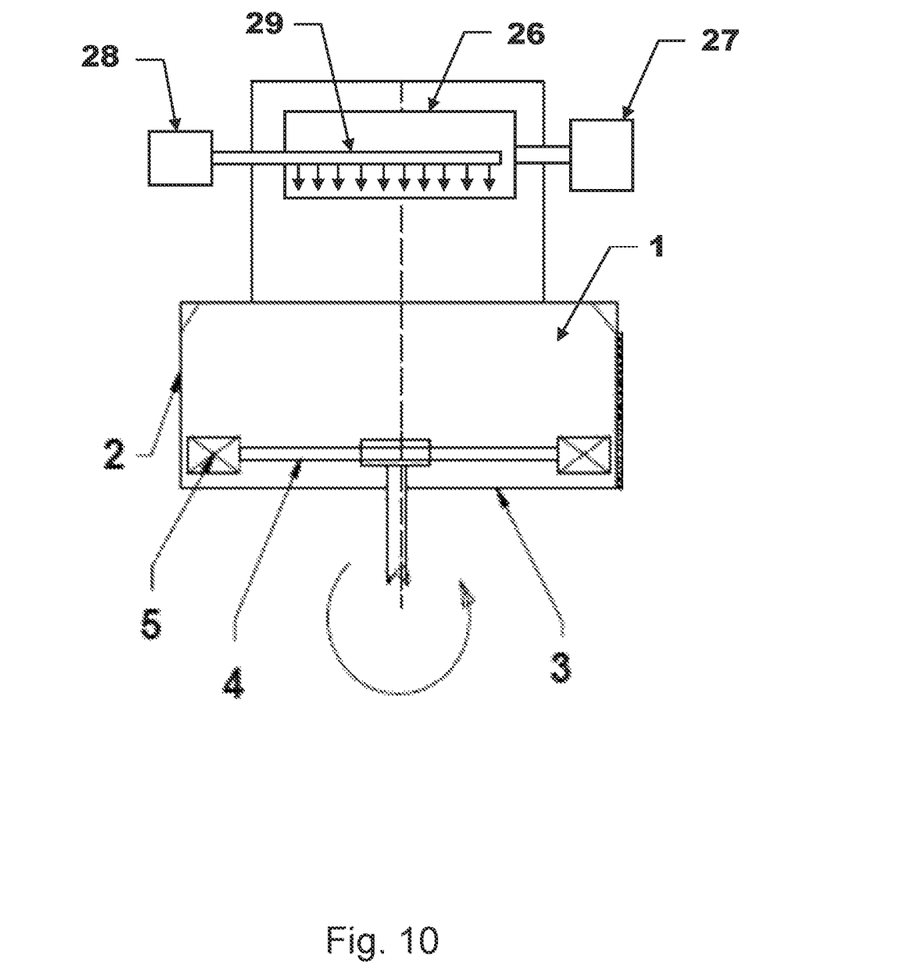
FIG. 10 is an alternative embodiment of an impact reactor arrangement.

FIGS. 9a and 9b show different air supply options.

Alternatively, it is possible to form the classifying device as a screen 26. The screen 26 can be roller-shaped, wherein the screen protrudes radially into the impact reactor. The screen can be caused to rotate by means of an electric motor 27 fastened outside the impact reactor. A cleaning apparatus in the form of a lance 29 protrudes into the roller-shaped screen 26. The lance can build up an overpressure from pressure source 28 in the interior of the screen cyclically or in dependence upon differential pressure, said overpressure serving to remove a filter cake adhering to the screen on the outer side. Furthermore, particles caught in the screen meshes, so-called trapped grains, can be removed. In addition to the cleaning by means of the pressure surge, mechanical cleaning can also be performed, for example by brushes.

The screen 26 is formed in such a way that particles having a particle size of 10 µm up to a size of several millimeters are allowed to pass through and are thus discharged from the impact reactor. The deflection wheel is formed in such a way that particles having a particle size of 5 µm to 500 µm are allowed to pass through and are thus discharged from the impact reactor.

The invention claimed is:

1. A method of processing accumulator batteries in an impact reactor, comprising:
providing an impact reactor having a cylindrical casing with a first end and a second end, a rotor provided with impact elements positioned proximate the first end, and a cover closing the second end facing away from the rotor;
providing a suction opening in the cover;
positioning a classifying device in communication with the suction opening;
feeding accumulator batteries into the impact reactor;
comminuting the accumulator batteries in the impact reactor by striking the accumulator batteries with the impact elements of the rotor;
removing components of the accumulator batteries from the impact reactor via the suction opening.

2. The method according to claim 1, wherein the components removed from the accumulator batteries comprise at least one of gaseous components and particulate components.

3. The method according to claim 1, further comprising removing combustible components from the accumulator batteries prior to the step of feeding the accumulator batteries into the impact reactor.

4. The method according to claim 3, wherein the step of removing combustible components from the accumulator batteries comprises subjecting the accumulator batteries to a treatment by pyrolysis.

5. The method according to claim 1, comprising treating air extracted from the impact reactor via the suction opening to remove noxious gases created by the step of comminution.

6. The method according to claim 5, wherein the step of treating the extracted air comprises at least one of combustion and filtration.

7. The method according to claim 1, further comprising subjecting the at least some of the components removed from the impact reactor to the classifying device, where the classifying device is a screen.

8. The method according to claim 7, wherein the screen is roller shaped.

9. The method according to claim 8, comprising rotating the screen in the suction opening.

10. The method according to claim 7, wherein the classifying device comprises an air separator.

11. The method according to claim 10, wherein the classifying device comprises a deflection wheel.

12. The method according to claim 11, wherein the deflection wheel comprises two mutually spaced apart rotor disks having rotor blades arranged between them.

13. The method according to claim 10, comprising separating the components in the classifying device by pre-selectable particle sizes.

14. The method according to claim 13, wherein the pre-selectable particle sizes ranges from 5 µm to 500 µm.

15. The method according to claim 1, comprising cleaning the classifying device with a cleaning apparatus.

16. The method according to claim 1, comprising supplying air through an opening in the impact reactor to increase airflow in the impact reactor.

17. The method according to claim 1, comprising drying the contents of the impact reactor by supplying air through an opening in the impact reactor.

18. The method according to claim 1, wherein the casing is closed in the region of the rotor.

* * * * *